(12) United States Patent
    Tang et al.

(10) Patent No.: US 10,644,830 B2
(45) Date of Patent: May 5, 2020

(54) DATA TRANSMISSION METHOD, RECEIVING DEVICE, AND TRANSMITTING DEVICE

(71) Applicant: GUANGDONG OPPO MOBILE TELECOMMUNICATIONS CORP., LTD., Dongguan, Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan, Guangdon (CN)

(*) Notice: Subject to any disclaimer, the term of this patent is extended or adjusted under 35 U.S.C. 154(b) by 0 days.

(21) Appl. No.: 16/223,476

(22) Filed: Dec. 18, 2018

(65) Prior Publication Data

US 2019/0123852 A1    Apr. 25, 2019

Related U.S. Application Data

(63) Continuation of application No. PCT/CN2016/100566, filed on Sep. 28, 2016.

(51) Int. Cl.
    *H04L 1/08* (2006.01)
    *H04L 1/00* (2006.01)
    (Continued)

(52) U.S. Cl.
    CPC .......... *H04L 1/0011* (2013.01); *H04B 7/024* (2013.01); *H04L 1/0606* (2013.01);
    (Continued)

(58) Field of Classification Search
    CPC ... H04L 1/0011; H04L 1/1819; H04L 1/0668; H04L 1/0606; H04L 1/0675; H04L 27/00; H04B 7/024
    See application file for complete search history.

(56) References Cited

U.S. PATENT DOCUMENTS 5,852,630 A * 12/1998 Langberg ............ H04L 27/2647
                                                   375/219
7,684,506 B2 * 3/2010 Murakami ............ H04L 1/0618
                                                   370/334
(Continued)

FOREIGN PATENT DOCUMENTS

CN      101005339 A     7/2007
CN      101669315 A     3/2010
WO      2009/090854 A2  7/2009

OTHER PUBLICATIONS

Yong Soo Cho; MIMO-OFDM MATLAB; Jun. 30, 2013; 34 pages.
(Continued)

*Primary Examiner* — Siu M Lee

(57) ABSTRACT

A data transmission method includes: transmitting, to at least one receiving device, a first TB set mapped with a first data stream and a second data stream, where the first data stream and the second data stream are used to transmit a first data signal and a second data signal; when a TB in the first TB set is transmitted erroneously, transmitting, to the at least one receiving device, a second TB set mapped with a third data stream and a fourth data stream, where a third data signal transmitted over the third data stream is a negative conjugate of the second data signal, a fourth data signal transmitted over the fourth data stream is a conjugate of the first data signal, and the second TB set and the first TB set are used to determine the first data signal and the second data signal.

12 Claims, 8 Drawing Sheets

100

A transmitting device transmits, at a first time instant, a first data signal to a receiving device over a first data stream using a first frequency and a second data signal to the receiving device over a second data stream using the first frequency — S110

The transmitting device transmits, at a second time instant after the first time instant, a third data signal to the receiving device over the first data stream using the first frequency and a fourth data signal to the receiving device over the second data stream using the first frequency, where the third data signal is equal to a negative conjugate of the second data signal, the fourth data signal is equal to a conjugate of the first data signal, and the first data stream and the second data stream are used by the receiving device to determine the first data signal and the second data signal — S120

(51) Int. Cl.
*H04L 27/00* (2006.01)
*H04L 1/18* (2006.01)
*H04L 1/06* (2006.01)
*H04B 7/024* (2017.01)

(52) U.S. Cl.
CPC .......... *H04L 1/0668* (2013.01); *H04L 1/0675* (2013.01); *H04L 1/1819* (2013.01); *H04L 27/00* (2013.01)

(56) References Cited

U.S. PATENT DOCUMENTS

| | | | | |
|---|---|---|---|---|
| 7,787,573 B2* | 8/2010 | Kim | ............. | H04L 1/0643 375/260 |
| 9,071,307 B2* | 6/2015 | Nakamura | ........... | H04B 7/0486 |
| 9,276,655 B2* | 3/2016 | Novak | ................ | H04B 7/0667 |
| 10,355,898 B2* | 7/2019 | Murakami | .......... | H04L 27/2604 |
| 2004/0057530 A1 | 3/2004 | Tarokh et al. | | |
| 2006/0182199 A1* | 8/2006 | Hong | .................. | H04L 1/0003 375/299 |
| 2007/0297528 A1 | 12/2007 | Feder et al. | | |
| 2009/0213955 A1* | 8/2009 | Higuchi | ............... | H04B 7/0669 375/267 |
| 2009/0241002 A1 | 9/2009 | Ko et al. | | |
| 2009/0262676 A1* | 10/2009 | Labbe | ................... | H04L 1/0625 370/312 |
| 2011/0103341 A1* | 5/2011 | Ko | ....................... | H04B 7/0669 370/329 |
| 2013/0294552 A1* | 11/2013 | Akutagawa | .............. | H04L 7/04 375/343 |
| 2016/0127030 A1* | 5/2016 | Kim | .................... | H04B 7/0413 370/329 |
| 2018/0102880 A1* | 4/2018 | Xu | ........................... | H04L 1/18 |

OTHER PUBLICATIONS

International Search Report dated Jul. 3, 2017; PCT/CN2016/100566.

Extended European Search Report dated Jun. 24, 2019; Appln. No. 16917124.6.

* cited by examiner

100

A transmitting device transmits, at a first time instant, a first data signal to a receiving device over a first data stream using a first frequency and a second data signal to the receiving device over a second data stream using the first frequency  ⌇S110

The transmitting device transmits, at a second time instant after the first time instant, a third data signal to the receiving device over the first data stream using the first frequency and a fourth data signal to the receiving device over the second data stream using the first frequency, where the third data signal is equal to a negative conjugate of the second data signal, the fourth data signal is equal to a conjugate of the first data signal, and the first data stream and the second data stream are used by the receiving device to determine the first data signal and the second data signal  ⌇S120

FIG. 1

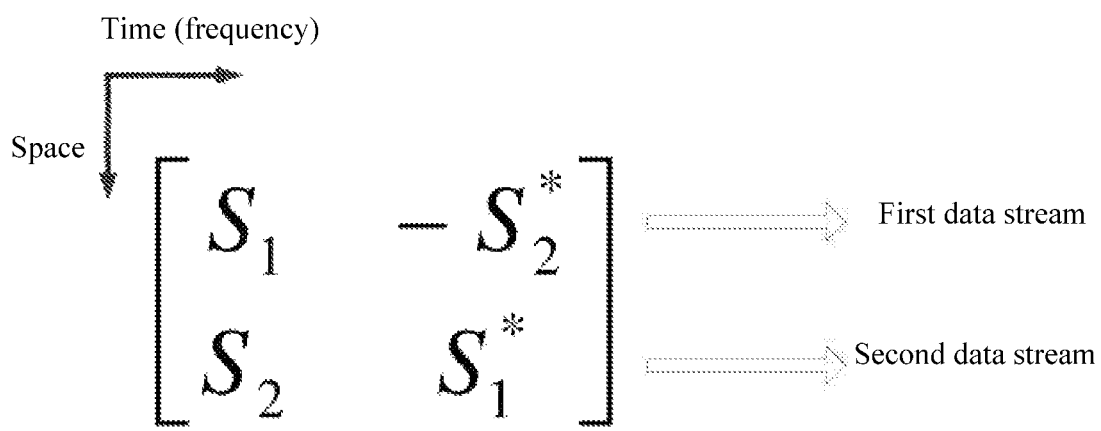

```
┌─────────────────────────────────────────────┐
│ The transmitting device transmits, at a first time instant, a first │
│   data signal to the receiving device over a first data stream      │
│ using a first frequency and a second data signal to the receiving   │──S210
│   device over a second data stream using the first frequency        │
└─────────────────────────────────────────────┘
                            │
┌─────────────────────────────────────────────┐
│ The transmitting device transmits, at the first time instant, a     │
│   third data signal to the receiving device over the first data     │
│ stream using a second frequency and a fourth data signal to the     │
│ receiving device over the second data stream using the second       │
│ frequency, where the third data signal is equal to a negative       │──S220
│ conjugate of the second data signal, the fourth data signal is      │
│ equal to a conjugate of the first data signal, and the first data   │
│ stream and the second data stream are used by the receiving         │
│ device to determine the first data signal and the second data       │
│                           signal                                     │
└─────────────────────────────────────────────┘
```

```
┌─────────────────────────────────────────────┐
│ A receiving device receives, at a first time instant, a first data  │
│ signal transmitted by a transmitting device over a first data       │
│   stream using a first frequency and a second data signal           │──S310
│ transmitted by the transmitting device over a second data           │
│         stream using the first frequency                             │
└─────────────────────────────────────────────┘
                            │
┌─────────────────────────────────────────────┐
│ The receiving device receives, at a second time instant after the   │
│   first time instant, a third data signal transmitted by the        │
│   transmitting device over the first data stream using the first    │
│     frequency and a fourth data signal transmitted by the           │
│ transmitting device over the second data stream using the first     │──S320
│   frequency, where the third data signal is equal to a negative     │
│ conjugate of the second data signal, and the fourth data signal     │
│       is equal to a conjugate of the first data signal              │
└─────────────────────────────────────────────┘
                            │
┌─────────────────────────────────────────────┐
│   The receiving device determines the first data signal             │
│   and the second data signal according to the first data            │──S330
│         stream and the second data stream                           │
└─────────────────────────────────────────────┘
```

```
┌─────────────────────────────────────────────────┐
│ The receiving device receives, at a first time  │
│ instant, a first data signal transmitted by the │
│ transmitting device over a first data stream    │
│ using a first frequency and a second data signal│─── S410
│ transmitted by the transmitting device over a   │
│ second data stream using the first frequency    │
└─────────────────────────────────────────────────┘
                        │
                        ▼
┌─────────────────────────────────────────────────┐
│ The receiving device receives, at the first time│
│ instant, a third data signal transmitted by the │
│ transmitting device over the first data stream  │
│ using a second frequency and a fourth data      │
│ signal transmitted by the transmitting device   │─── S420
│ over the second data stream using the second    │
│ frequency, where the third data signal is equal │
│ to a negative conjugate of the second data      │
│ signal, and the fourth data signal is equal to  │
│ a conjugate of the first data signal            │
└─────────────────────────────────────────────────┘
                        │
                        ▼
┌─────────────────────────────────────────────────┐
│ The receiving device determines the first data  │
│ signal and the second data signal according to  │─── S430
│ the first data stream and the second data stream│
└─────────────────────────────────────────────────┘
```

A transmitting device transmits a first transmission block set to at least one receiving device, where a transmission block in the first transmission block set is mapped with a first data stream and the second data stream, and the first data stream and the second data stream are used to transmit a data signal including a first data signal and a second data signal  S510

When it is determined that the transmission block in the first transmission block set is transmitted erroneously, the transmitting device transmits a second transmission block set to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal  S520

A first receiving device receives a first transmission block set transmitted by the transmitting device to the at least one receiving device, where a transmission block in the first transmission block set is mapped with a first data stream and a second data stream, the first data stream and the second data stream are used to transmit a data signal including a first data signal and a second data signal, and the first receiving device is any one of the at least one receiving device ~S610

When the transmission block in the first transmission block set is transmitted erroneously, the first receiving device receives a second transmission block set transmitted by the transmitting device to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal ~S620

FIG. 7

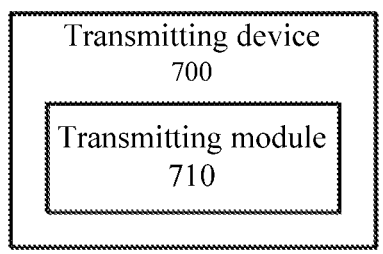

FIG. 8

DATA TRANSMISSION METHOD, RECEIVING DEVICE, AND TRANSMITTING DEVICE

CROSS-REFERENCE TO RELATED APPLICATIONS

This application is a continuation of International Application No. PCT/CN2016/100566 filed on Sep. 28, 2016, which is incorporated herein by reference in its entirety.

TECHNICAL FIELD

The present disclosure relates to the field of communications and, in particular, to a data transmission method, a receiving device and a transmitting device.

BACKGROUND

In a long term evolution (Long Term Evolution, LTE) system, multi-antenna technologies may be used for space division multiplexing to improve spectrum utilization. For example, antenna 1 and antenna 2 transmit data signals S1 and S2, respectively, and the same time and frequency resources are used. A receiving end may recover S1 and S2 through various algorithms, such as serial interference cancellation (SIC). In this example, S1 and S2 may also be emitted by different beams which are formed by multiple antennas via beamforming.

In LTE, different beams may correspond to different data streams, different data streams may be mapped to the same transmission block or different transmission blocks (TB), and channel coding is performed in units of TB. The receiving end may recover S1 and S2 using various receivers according to different mapping manners. For example, an SIC receiver or an interference rejection combining (IRC) receiver may be used. Since S1 and S2 are transmitted using the same time and frequency resources, the receivers' focus lies in how to eliminate mutual interference between the data stream containing S1 and the data stream containing S2.

In space division multiplexing for the LTE, since the data streams with S1 and S2 transmitted interfere with each other, it is easy to cause an error in a receiving device.

SUMMARY

The present application provides a data transmission method, a transmitting device, and a receiving device, which can improve efficiency of data transmission.

In a first aspect, a data transmission method is provided, including: transmitting, by a transmitting device, at a first time instant, a first data signal to a receiving device over a first data stream using a first frequency and a second data signal to the receiving device over a second data stream using the first frequency, and transmitting, by the transmitting device, at a second time instant after the first time instant, a third data signal to the receiving device over the first data stream using the first frequency and a fourth data signal to the receiving device over the second data stream using the first frequency, where the third data signal is equal to a negative conjugate of the second data signal, the fourth data signal is equal to a conjugate of the first data signal, and the first data stream and the second data stream are used by the receiving device to determine the first data signal and the second data signal; or transmitting, by the transmitting device, at a first time instant, a first data signal to the receiving device over a first data stream using a first frequency and a second data signal to the receiving device over a second data stream using the first frequency, and transmitting, by the transmitting device, at the first time instant, a third data signal to the receiving device over the first data stream using a second frequency and a fourth data signal to the receiving device over the second data stream using the second frequency, where the third data signal is equal to a negative conjugate of the second data signal, the fourth data signal is equal to a conjugate of the first data signal, and the first data stream and the second data stream are used by the receiving device to determine the first data signal and the second data signal.

Therefore, according to the data transmission method in the embodiment of the present application, efficiency of data transmission can be improved by transmitting, at different time instants, a first data stream carrying a first data signal and a second data stream carrying a second data signal using the same frequency, or transmitting, at the same time instant, the first data stream carrying the first data signal and the second data stream carrying the second data signal using different frequencies.

In conjunction with the first aspect, in an implementation of the first aspect, the first data stream and the second data stream are mapped to a same transmission block.

In conjunction with the first aspect and the implementation described above, in another implementation of the first aspect, the transmitting device is a terminal device, and the receiving device is a base station; or the transmitting device is a base station, and the receiving device is a terminal device.

In conjunction with the first aspect and an implementation described above, in another implementation of the first aspect, the method further comprises: transmitting, by the base station, indication information to the terminal device, where the indication information is used to indicate a mode for transmission of a data signal between the terminal device and the base station.

In conjunction with the first aspect and an implementation described above, in another implementation of the first aspect, the base station includes a first base station and a second base station when the transmitting device is the base station, the first base station is configured to transmit a data signal in the first data stream, and the second base station is configured to transmit a data signal in the second data stream.

In a second aspect, a data transmission method is provided, including: receiving, by a receiving device, at a first time instant, a first data signal transmitted by a transmitting device over a first data stream using a first frequency and a second data signal transmitted by the transmitting device over a second data stream using the first frequency, receiving, by the receiving device, at a second time instant after the first time instant, a third data signal transmitted by the transmitting device over the first data stream using the first frequency and a fourth data signal transmitted by the transmitting device over the second data stream using the first frequency, where the third data signal is equal to a negative conjugate of the second data signal, and the fourth data signal is equal to a conjugate of the first data signal, and determining, by the receiving device, the first data signal and the second data signal according to the first data stream and the second data stream; or receiving, by the receiving device, at a first time instant, a first data signal transmitted by the transmitting device over a first data stream using a first frequency and a second data signal transmitted by the transmitting device over a second data stream using the first frequency, receiving, by the receiving device, at the first time instant, a third data signal transmitted by the transmitting device over the first data stream using a second frequency and a fourth data signal transmitted by the transmitting device over the second data stream using the second frequency, where the third data signal is equal to a negative conjugate of the second data signal, and the fourth data signal is equal to a conjugate of the first data signal, and determining, by the receiving device, the first data signal and the second data signal according to the first data stream and the second data stream.

Therefore, according to the data transmission method in the embodiment of the present application, efficiency of data transmission can be improved by transmitting, at different time instants, a first data stream carrying a first data signal and a second data stream carrying a second data signal using the same frequency, or transmitting, at the same time instant, the first data stream carrying the first data signal and the second data stream carrying the second data signal using different frequencies.

In conjunction with the second aspect, in an implementation of the second aspect, the first data stream and the second data stream are mapped to a same transmission block.

In conjunction with the second aspect and the implementation described above, in another implementation of the second aspect, the receiving device is a base station, and the transmitting device is a terminal device; or the receiving device is a terminal device, and the transmitting device is a base station.

In conjunction with the second aspect and an implementation described above, in another implementation of the second aspect, the method further includes: receiving, by the terminal device, indication information transmitted by the base station, where the indication information is used to indicate a mode for transmission of a data signal between the terminal device and the base station.

In conjunction with the second aspect and an implementation described above, in another implementation of the second aspect, the base station includes a first base station and a second base station when the transmitting device is the base station, the first base station is configured to transmit a data signal in the first data stream, and the second base station is configured to transmit a data signal in the second data stream.

In a third aspect, a data transmission method is provided, including: transmitting, by a transmitting device, a first transmission block set to at least one receiving device, where a transmission block in the first transmission block set is mapped with a first data stream and the second data stream, and the first data stream and the second data stream are used to transmit a data signal including a first data signal and a second data signal; and when the transmission block in the first transmission block set is transmitted erroneously, transmitting, by the transmitting device, a second transmission block set to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal.

Therefore, according to the data transmission method in the embodiment of the present application, the transmitting device transmits a first data signal and a second data signal through a first TB set, and transmits a third data stream and a fourth data stream through a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

In conjunction with the third aspect, in an implementation of the third aspect, the first data stream is used to transmit the first data signal and the second data stream is used to transmit the second data signal.

In conjunction with the third aspect and the implementation described above, in another implementation of the third aspect, the first data stream is used to transmit, at a first time instant, the first data signal using a first frequency and the third data signal using a second frequency; and the second data stream is used to transmit, at the first time instant, the second data signal using the first frequency and the fourth data signal using the second frequency.

In conjunction with the third aspect and an implementation described above, in another implementation of the third aspect, the first data stream is used to transmit, at a first time instant, the first data signal using a first frequency, and transmit, at a second time instant, the third data signal using the first frequency; and the second data stream is used to transmit, at the first time instant, the second data signal using the first frequency, and transmit, at the second time instant, the fourth data signal using the first frequency.

In conjunction with the third aspect and an implementation described above, in another implementation of the third aspect, the first transmission block set includes a first transmission block to which the first data stream and the second data stream are both mapped, and the second transmission block set includes a second transmission block to which the third data stream and the fourth data stream are both mapped.

In conjunction with the third aspect and an implementation described above, in another implementation of the third aspect, the first transmission block set includes a first transmission block to which the first data stream is mapped and a second transmission block to which the second data stream is mapped, the second transmission block set includes a third transmission block to which the third data stream is mapped and a fourth transmission block to which the fourth data stream is mapped.

In conjunction with the third aspect and an implementation described above, in another implementation of the third aspect, the transmitting device is a base station, and the at least one receiving device includes a first terminal device and a second terminal device, the transmitting, by the transmitting device, the first transmission block set to the at least one receiving device includes: transmitting, by the base station, the first transmission block to the first terminal device and the second transmission block to the second terminal device; the transmitting, by the transmitting device, the second transmission block set to the at least one receiving device includes: transmitting, by the base station, the third transmission block to the first terminal device and the fourth transmission block to the second terminal device, where the first transmission block and the third transmission block are used by the first terminal device to determine the first data signal, and the second transmission block and the fourth transmission block are used by the second terminal device to determine the second data signal.

In conjunction with the third aspect and an implementation described above, in another implementation of the third aspect, the transmitting device is a terminal device, and the at least one receiving device is a base station; or the transmitting device is a base station, and the at least one receiving device is a terminal device.

In conjunction with the third aspect and an implementation described above, in another implementation of the third aspect, the method further includes: transmitting, by the base station, indication information to the terminal device, where the indication information is used to indicate a retransmission mode used by the terminal device when a transmission block is transmitted erroneously.

In a fourth aspect, a data transmission method applicable to a communication system including a transmitting device and at least one receiving device is provided, including: receiving, by a first receiving device, a first transmission block set transmitted by the transmitting device to the at least one receiving device, where a transmission block in the first transmission block set is mapped with a first data stream and a second data stream, the first data stream and the second data stream are used to transmit a data signal including a first data signal and a second data signal, and the first receiving device is any one of the at least one receiving device; and when the transmission block in the first transmission block set is transmitted erroneously, receiving, by the first receiving device, a second transmission block set transmitted by the transmitting device to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal.

Therefore, according to the data transmission method in the embodiment of the present application, the receiving device receives a first data signal and a second data signal transmitted by the transmitting device over a first TB set, and then receives a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

In conjunction with the fourth aspect, in an implementation of the fourth aspect, the first data stream is used to transmit the first data signal and the second data stream is used to transmit the second data signal.

In conjunction with the fourth aspect and the implementation described above, in another implementation of the fourth aspect, the first data stream is used to transmit, at a first time instant, the first data signal using a first frequency and the third data signal using a second frequency; and the second data stream is used to transmit, at the first time instant, the second data signal using the first frequency and the fourth data signal using the second frequency.

In conjunction with the fourth aspect and an implementation described above, in another implementation of the fourth aspect, the first data stream is used to transmit, at a first time instant, the first data signal using a first frequency, and transmit, at a second time instant, the third data signal using the first frequency; and the second data stream is used to transmit, at the first time instant, the second data signal using the first frequency, and transmit, at the second time instant, the fourth data signal using the first frequency.

In conjunction with the fourth aspect and an implementation described above, in another implementation of the fourth aspect, the first transmission block set includes a first transmission block to which the first data stream and the second data stream are both mapped, and the second transmission block set includes a second transmission block to which the third data stream and the fourth data stream are both mapped.

In conjunction with the fourth aspect and an implementation described above, in another implementation of the fourth aspect, the first transmission block set includes a first transmission block to which the first data stream is mapped and a second transmission block to which the second data stream is mapped, the second transmission block set includes a third transmission block to which the third data stream is mapped and a fourth transmission block to which the fourth data stream is mapped.

In conjunction with the fourth aspect and an implementation described above, in another implementation of the fourth aspect, the at least one receiving device includes the first terminal device and a second terminal device, and the transmitting device is a base station; the receiving, by the first receiving device, the first transmission block set transmitted by the transmitting device to the at least one receiving device includes: receiving, by the first terminal device, the first transmission block transmitted by the base station, where the second transmission block is transmitted by the base station to the second terminal device; the receiving, by the first receiving device, the second transmission block set transmitted by the transmitting device to the at least one receiving device includes: receiving, by the first terminal device, the third transmission block transmitted by the base station, where the fourth transmission block is transmitted by the base station to the second terminal device, the first transmission block and the third transmission block are used by the first terminal device to determine the first data signal, and the second transmission block and the fourth transmission block are used by the second terminal device to determine the second data signal.

In conjunction with the fourth aspect and an implementation described above, in another implementation of the fourth aspect, the first receiving device is a base station, and the transmitting device is a terminal device; or the first receiving device is a terminal device, and the transmitting device is a base station.

In conjunction with the fourth aspect and an implementation described above, in another implementation of the fourth aspect, the method further includes: receiving, by the terminal device, indication information transmitted by the base station, where the indication information is used to indicate a retransmission mode used by the terminal device when a transmission block is transmitted erroneously.

In a fifth aspect, a transmitting device is provided for performing the method in the first aspect or any possible implementation of the first aspect. In particular, the transmitting device includes a unit for performing the method in the first aspect or any possible implementation of the first aspect.

In a sixth aspect, a receiving device is provided for performing the method in the second aspect or any possible implementation of the second aspect. In particular, the receiving device includes a unit for performing the method in the second aspect or any possible implementation of the second aspect.

In a seventh aspect, a transmitting device is provided for performing the method in the third aspect or any possible implementation of the third aspect. In particular, the transmitting device includes a unit for performing the method in the third aspect or any possible implementation of the third aspect.

In an eighth aspect, a receiving device is provided for performing the method in the fourth aspect or any possible implementation of the fourth aspect. In particular, the receiving device includes a unit for performing the method in the fourth aspect or any possible implementation of the fourth aspect.

In a ninth aspect, a transmitting device is provided, including: a memory and a processor, where the memory is configured to store an instruction, the processor is configured to execute the instruction stored in the memory, and when the processor executes the instruction stored in the memory, the execution causes the processor to perform the method in the first aspect or any possible implementation of the first aspect.

In a tenth aspect, a receiving device is provided, including: a memory and a processor, where the memory is configured to store an instruction, the processor is configured to execute the instruction stored in the memory, and when the processor executes the instruction stored in the memory, the execution causes the processor to perform the method in the second aspect or any possible implementation of the second aspect.

In an eleventh aspect, a transmitting device is provided, including: a memory and a processor, where the memory is configured to store an instruction, the processor is configured to execute the instruction stored in the memory, and when the processor executes the instruction stored in the memory, the execution causes the processor to perform the method in the third aspect or any possible implementation of the third aspect.

In a twelfth aspect, a receiving device is provided, including: a memory and a processor, where the memory is configured to store an instruction, the processor is configured to execute the instruction stored in the memory, and when the processor executes the instruction stored in the memory, the execution causes the processor to perform the method in the fourth aspect or any possible implementation of the fourth aspect.

In a thirteenth aspect, a computer readable medium for storing a computer program is provided, where the computer program includes an instruction for performing the method in the first aspect or any possible implementation of the first aspect.

In a fourteenth aspect, a computer readable medium for storing a computer program is provided, where the computer program includes an instruction for performing the method in the second aspect or any possible implementation of the second aspect.

In a fifteenth aspect, a computer readable medium for storing a computer program is provided, where the computer program includes an instruction for performing the method in the third aspect or any possible implementation of the third aspect.

In a sixteenth aspect, a computer readable medium for storing a computer program is provided, where the computer program includes an instruction for performing the method in the fourth aspect or any possible implementation of the fourth aspect.

BRIEF DESCRIPTION OF DRAWINGS

In order to describe the technical solution in embodiments of the present disclosure more clearly, accompanying drawings used in the description of embodiments of the present disclosure will be briefly described hereunder. Obviously, the described drawings are merely some embodiments of present disclosure. For persons skilled in the art, other drawings may be obtained based on these drawings without any creative effort.

FIG. 1 is a schematic flow chart of a data transmission method according to an embodiment of the present disclosure;

FIG. 2 is a schematic diagram illustrating a data stream for transmission of a data signal according to an embodiment of the present disclosure;

FIG. 3 is a schematic flow chart of a data transmission method according to another embodiment of the present disclosure;

FIG. 4 is a schematic flow chart of a data transmission method according to still another embodiment of the present disclosure;

FIG. 5 is a schematic flow chart of a data transmission method according to still another embodiment of the present disclosure;

FIG. 6 is a schematic flow chart of a data transmission method according to still another embodiment of the present disclosure;

FIG. 7 is a schematic flow chart of a data transmission method according to still another embodiment of the present disclosure;

FIG. 8 is a schematic block diagram of a transmitting device according to an embodiment of the present disclosure;

DESCRIPTION OF EMBODIMENTS

Figure 9:
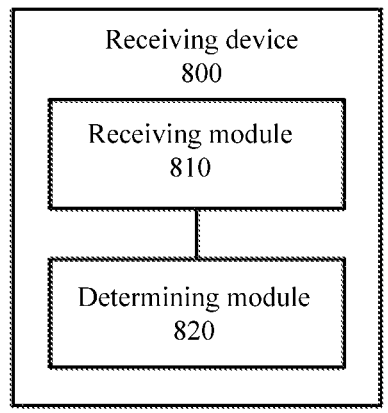
FIG. 9 is a schematic block diagram of a receiving device according to an embodiment of the present disclosure.

The technical solution in the embodiments of the present disclosure will be clearly and completely described below with reference to the accompanying drawings in the embodiments of the present disclosure. Obviously, the described embodiments are a part of the embodiments of the present disclosure, rather than all embodiments of the present disclosure. All other embodiments obtained by those skilled in the art based on the embodiments of the disclosure application without any creative effort should fall into the protection scope of the present disclosure.

It should be understood that the technical solution in the embodiments of the present application can be applied to various communication systems, for example, a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS) or a worldwide interoperability for microwave access (WiMAX) communication system, etc.

The technical solution in the embodiments of the present application can be applied to communications between a terminal device and a base station, and can also be applied to communications between terminal devices (D2D).

In the embodiments of the present application, the base station may be a base station (BTS) in GSM or CDMA, or a base station (NodeB) in WCDMA, or an evolved Node B (eNB or e-NodeB) in LTE, or a device for providing an access service in 5G, which is not limited in the embodiments of the present application.

The terminal device may be termed as user equipment (UE), an access terminal, a subscriber unit, a subscriber station, a mobile station, a remote station, a remote terminal, a mobile device, a user terminal, a terminal, a wireless communication device, a user agent or a user device, etc. The terminal device may be an STA (STAION) in a wireless local area network (WLAN), a cellular phone, a cordless phone, an SIP (Session Initiation Protocol) phone, a WLL (Wireless Local Loop) station, a PDA (Personal Digital Assistant), a handheld device with wireless communication capabilities, a computing device or other processing devices connected to a wireless modem, an in-vehicle device, a wearable device, or terminal devices in a future 5G network, or a terminal device in a future evolved PLMN network, etc.

FIG. 1 shows a schematic flow chart of a data transmission method 100 according to an embodiment of the present disclosure. The method 100 can be applied to a communication system including a receiving device and a transmitting device, which may be performed by the transmitting device. Specifically, the transmitting device may be the base station or the terminal device described above, and the embodiment of the present disclosure is not limited thereto. As shown in FIG. 1, the method 100 includes:

S110: a transmitting device transmits, at a first time instant, a first data signal to a receiving device over a first data stream using a first frequency and a second data signal to the receiving device over a second data stream using the first frequency, and S120: the transmitting device transmits, at a second time instant after the first time instant, a third data signal to the receiving device over the first data stream using the first frequency and a fourth data signal to the receiving device over the second data stream using the first frequency, where the third data signal is equal to a negative conjugate of the second data signal, the fourth data signal is equal to a conjugate of the first data signal, and the first data stream and the second data stream are used by the receiving device to determine the first data signal and the second data signal.

In an embodiment of the present disclosure, as shown in FIG. 2, the first column of the matrix may correspond to a data signal transmitted at a first time instant, and the second column corresponds to a data signal transmitted at a second time instant, a frequency used at the first time instant is the same as that used at the second time instant, that is, the first frequency. Specifically, the transmitting device transmits, at a first time instant, a first data signal $S_1$ over a first data stream using a first frequency and a second data signal $S_2$ over a second data stream using the first frequency; the transmitting device transmits, at a second time instant after the first time instant, a negative conjugate of the second data signal (that is, the third data signal $-S_2^*$) over the first data stream using the first frequency and a conjugate of the first data signal (that is, the fourth data signal $S_1^*$) over the second data stream using the first frequency; and the receiving device then parses out the first data signal and the second data signal according to the received data signals transmitted at the two time instants.

In an embodiment, FIG. 3 shows a schematic flow chart of a data transmission method 200 according to another embodiment of the present disclosure. The method 200 can be applied to a communication system in which a receiving device and a transmitting device are included, which can be performed by the transmitting device. Specifically, the transmitting device may be a base station or a terminal, and the embodiment of the present disclosure is not limited thereto. As shown in FIG. 3, the method 200 includes:

S210: the transmitting device transmits, at a first time instant, a first data signal to the receiving device over a first data stream using a first frequency and a second data signal to the receiving device over a second data stream using the first frequency, and S220: the transmitting device transmits, at the first time instant, a third data signal to the receiving device over the first data stream using a second frequency and a fourth data signal to the receiving device over the second data stream using the second frequency, where the third data signal is equal to a negative conjugate of the second data signal, the fourth data signal is equal to a conjugate of the first data signal, and the first data stream and the second data stream are used by the receiving device to determine the first data signal and the second data signal.

In an embodiment of the present disclosure, as shown in FIG. 2, the first column of the matrix may correspond to the first frequency, the second column corresponds to the second frequency, and data signals of the first column and the second column are transmitted at the same time instant, that is, both are transmitted at the first time instant. Specifically, the transmitting device transmits, at a first time instant, a first data signal $S_1$ over a first data stream using a first frequency and a second data signal $S_2$ over a second data stream using the first frequency, a negative conjugate of the second data signal $S_2$ (that is, the third data signal $-S_2^*$) over the first data stream using a second frequency and a conjugate of the first data signal $S_1$ (that is, the fourth data signal $S_1^*$) over the second data stream using the second frequency, and the receiving device then parses out the first data signal and the second data signal in data streams according to the received data streams transmitted via different frequencies at the same time instant.

It should be understood that, for the method 100 and the method 200 described above, if a data signal S1 or S2 of one symbol is transmitted at each time instant, then data signals of multiple symbols are transmitted sequentially in time at multiple time instants or frequencies so that the first data stream and the second data stream may be formed. For example, a data signal of one symbol, that is, the first data signal $S_1$, is transmitted at any time instant, that is, the first time instant; a data signal of another symbol, that is, the third data signal $-S_2^*$, is transmitted at a next time instant of the first time instant, that is, the second time instant; then the first data stream is formed for a period of time, that is, after multiple consecutive time instants.

It should be understood that, for the method 100 and the method 200 described above, the first data stream and the second data stream may be mapped to the same transmission block TB, or may be mapped to different TBs, the embodiment of the present disclosure is not limited thereto. For example, when the transmitting device is any one of the base stations and the receiving device is any one of the terminal devices, the first data stream and the second data stream transmitted by the base station to the terminal device may be mapped to the same TB or different TBs, and the corresponding terminal device determines the first data signal and the second data signal according to the same TB or different TBs; when the transmitting device is a base station and the receiving device includes two terminal devices, respectively being a first terminal device and a second terminal device, the first data stream and the second data stream are respectively mapped to two different TBs, that is, the first data stream is mapped to the first TB, and the second data stream is mapped to the second TB; the base station transmits the first TB to the first terminal device and the second TB to the second terminal device, respectively; correspondingly, the first terminal device determines the first data signal according to the first data stream of the first TB, and the second terminal device determines the second data signal according to the second data stream of the second TB.

It should be understood that the method 100 and the method 200 described above may be used for an uplink data transmission process, that is, the transmitting device may be a terminal device, and the corresponding receiving device may be a base station; or may be used for a downlink data transmission process, that is, the transmitting device may be a base station, and the corresponding receiving device may be a terminal device. In addition, the transmitting device and the receiving device may refer to one or more devices. For example, the transmitting device may be a base station and include a first base station and a second base station; alternatively, the receiving device may be a terminal device, and the terminal device includes a first terminal device and a second terminal device.

It should be understood that, for the method 100 and the method 200 described above, the transmitting device and the receiving device using the foregoing methods for data transmission, and in each transmission, a transmission mode that is used may be indicated via indication information. Specifically, indication information may be transmitted by the base station to the terminal device either in an uplink data transmission process or a downlink data transmission process. The indication information may be a physical layer signaling, such as downlink control information (DCI). The indication information may indicate a transmission mode used for data transmission between the base station and the terminal device, where the transmission mode may be spatial diversity mode for the method 100 or the method 200 in the embodiments of the present disclosure; or the indication information may also indicate to use a space division multiplexing mode in the prior art, that is, the first data signal is transmitted over the first data stream and the second data signal is transmitted over the second data stream, and the embodiment of the present disclosure is not limited thereto. In this way, the base station and the terminal device can flexibly switch between different transmission modes via the data transmission mode indicated by the base station to the terminal device. For example, a corresponding transmission mode may be selected according to a channel condition, and flexible switching may be achieved using the indication information.

It should be understood that, for the method 100 and the method 200 described above, in an example where the transmitting device is a base station including a first base station and a second base station and the receiving device is any one of the terminal devices, data streams may be transmitted by different base stations to the terminal device, respectively, that is, the first base station transmits the first data stream to the terminal device, and the second base station transmits the second data stream to the terminal device.

Specifically, for the method 100, at a first time instant, the first base station transmits, a first data signal $S_1$ over a first data stream using a first frequency, and the second base station transmits a second data signal $S_2$ over a second data stream using the first frequency; at a second time instant after the first time instant, the first base station transmits a negative conjugate of the second data signal (that is, the third data signal $-S_2^*$) over the first data stream using the first frequency, the second base station transmits a conjugate of the first data signal (that is, the fourth data signal $S_1^*$) over the second data stream using the first frequency, while the terminal device respectively receives the data streams transmitted from the two base stations, and the terminal device determines the first data signal and the second data signal according to the first data stream and the second data stream.

Similarly, for the method 200, at a first time instant, the first base station transmits, a first data signal $S_1$ over a first data stream using a first frequency, and the second base station transmits a second data signal $S_2$ over a second data stream using the first frequency; the first base station also transmits a negative conjugate of the second data signal $S_2$ (that is, the third data signal $-S_2^*$) over the first data stream using a second frequency, the second base station transmits a conjugate of the first data signal $S_1$ (that is, the fourth data signal $S_1^*$) over the second data stream using the second frequency, while the terminal device respectively receives the data streams transmitted from the two base stations, and the terminal device determines the first data signal and the second data signal according to the first data stream and the second data stream.

In the embodiments of the present disclosure, the transmission of the first data stream and the second data stream by different base stations may be a mode in which adjacent base stations perform coordinated multiple points transmission/reception (CoMP). By transmitting two data streams respectively through two base stations, reliability of data transmission at a cell edge may be improved.

In an embodiment, the transmission of the first data stream and the second data stream by different base stations may also be a mode in which adjacent base stations implement soft handover. In a current LTE, when a terminal device performs a handover, it needs to disconnect from an original base station first, and then establish a connection with a target base station. However, with method of the method 100 or the method 200 in the embodiment of the present disclosure, the two base stations may simultaneously transmit data to the terminal device, and spatial diversity can be achieved, thereby improving reliability of data transmission during a handover process.

Specifically, in a soft handover process, serving base stations in the original base station and the target base station need to transmit indication information to the terminal device, and the indication information may indicate that the terminal device performs data transmission using a method in the embodiments of the present disclosure. When the terminal has been switched to a range of a target cell, the serving base stations also need to indicate that the terminal device terminates using a mode in the embodiments of the present disclosure, or may switch one of the data streams to the target base station by means of network coordination. For example, before the handover, the first base station serves as the original base station to transmit the first data stream, and the second base station serves as the target base station to transmit the second data stream; when the terminal device has moved to the range of the target cell, that is, the range of the second base station, the first data stream may also be migrated for transmission through the second base station by means of network coordination, in this way, the terminal device does not need to transform the data transmission mode; in addition, after switching to the second base station, the second base station may continue to use the transmission mode of the method 100 or the method 200 in the embodiments of the present disclosure to perform data transmission with the terminal device, and may also perform data transmission using other methods in the prior art, the embodiment of the present disclosure is not limited thereto.

Therefore, according to the data transmission method in the embodiment of the present application, efficiency of data transmission can be improved by transmitting, at different time instants, a first data stream carrying a first data signal and a second data stream carrying a second data signal using the same frequency, or transmitting, at the same time instant, the first data stream carrying the first data signal and the second data stream carrying the second data signal using different frequencies.

A data transmission method according to an embodiment of the present disclosure has been described above in detail from the perspective of the transmitting device in conjunction with FIG. 1 to FIG. 3, and a data transmission method according to an embodiment of the present disclosure will be described below from the perspective of the receiving device in conjunction with FIG. 4 to FIG. 5.

FIG. 4 shows a schematic flow chart of a data transmission method 300 according to still another embodiment of the present disclosure. The method 300 can be applied to a communication system including a receiving device and a transmitting device, which may be performed by the receiving device. Specifically, the receiving device may be a base station or a terminal device, and the embodiment of the present disclosure is not limited thereto. As shown in FIG. 4, the method 300 includes:

S310: a receiving device receives, at a first time instant, a first data signal transmitted by a transmitting device over a first data stream using a first frequency and a second data signal transmitted by the transmitting device over a second data stream using the first frequency;

S320: the receiving device receives, at a second time instant after the first time instant, a third data signal transmitted by the transmitting device over the first data stream using the first frequency and a fourth data signal transmitted by the transmitting device over the second data stream using the first frequency, where the third data signal is equal to a negative conjugate of the second data signal, and the fourth data signal is equal to a conjugate of the first data signal; and S330: the receiving device determines the first data signal and the second data signal according to the first data stream and the second data stream.

It should be understood that the method 300 corresponds to the method 100 in the embodiments of the present disclosure, and for the method 300, steps at the receiving device in the method 100 may be performed accordingly, thus details will not be described herein again.

FIG. 5 shows a schematic flow chart of a data transmission method 400 according to still another embodiment of the present disclosure. The method 400 can be applied to a communication system including a receiving device and a transmitting device, which may be performed by the receiving device. Specifically, the receiving device may be a base station or a terminal device, and the embodiment of the present disclosure is not limited thereto. As shown in FIG. 5, the method 400 includes:

S410: the receiving device receives, at a first time instant, a first data signal transmitted by the transmitting device over a first data stream using a first frequency and a second data signal transmitted by the transmitting device over a second data stream using the first frequency;

S420: the receiving device receives, at the first time instant, a third data signal transmitted by the transmitting device over the first data stream using a second frequency and a fourth data signal transmitted by the transmitting device over the second data stream using the second frequency, where the third data signal is equal to a negative conjugate of the second data signal, and the fourth data signal is equal to a conjugate of the first data signal; and S430: the receiving device determines the first data signal and the second data signal according to the first data stream and the second data stream.

It should be understood that the method 400 corresponds to the method 200 in the embodiments of the present disclosure, and for the method 400, steps at the receiving device in the method 200 may be performed accordingly, thus details will not be described herein again.

In an embodiment, for the method 300 and the method 400 described above, the first data stream and the second data stream are mapped to a same TB.

In an embodiment, for the method 300 and the method 400 described above, wherein the receiving device is a base station, and the transmitting device is a terminal device; or the receiving device is a terminal device, and the transmitting device is a base station.

In an embodiment, for the method 300 and the method 400 described above, the method further includes: the terminal device receives indication information transmitted by the base station, where the indication information is used to indicate a mode for transmission of a data signal between the terminal device and the base station.

In an embodiment, for the method 300 and the method 400 described above, the base station includes a first base station and a second base station when the transmitting device is the base station, the first base station is configured to transmit a data signal in the first data stream, and the second base station is configured to transmit a data signal in the second data stream.

Therefore, according to the data transmission method in the embodiment of the present application, efficiency of data transmission can be improved by transmitting, at different time instants, a first data stream carrying a first data signal and a second data stream carrying a second data signal using the same frequency, or transmitting, at the same time instant, the first data stream carrying the first data signal and the second data stream carrying the second data signal using different frequencies.

FIG. 6 shows a schematic flow chart of a data transmission method 500 according to still another embodiment of the present disclosure. The method 500 can be applied to a communication system including a transmitting device and at least one receiving device, which may be performed by the transmitting device. Specifically, the transmitting device may be a base station or a terminal device, and the embodiment of the present disclosure is not limited thereto. As shown in FIG. 6, the method 500 includes:

S510: a transmitting device transmits a first transmission block set to at least one receiving device, where a transmission block in the first transmission block set is mapped with a first data stream and the second data stream, and the first data stream and the second data stream are used to transmit a data signal including a first data signal and a second data signal; and S520: when the receiving device determines that the transmission block in the first transmission block set is transmitted erroneously, the transmitting device transmits a second transmission block set to the receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal.

In an embodiment, the transmitting device may transmit the first TB set using a transmission mode in the prior art, that is, transmit the first data signal and the second data signal. For example, the transmitting device may transmit the first data signal over the first data stream and the second data signal over the second data stream, that is, the transmitting device transmits data signals by means of space division multiplexing, and correspondingly, the at least one receiving device parses out the first data signal and the second data signal according to the first TB set mapped in the received first data stream and second data stream.

In an embodiment, the transmitting device may also transmit the first TB set using the transmission mode pertaining to the method 100 or the method 200 in the embodiments of the present disclosure rather than using the transmission mode in the prior art, that is, transmit the first data signal and the second data signal. Specifically, the transmitting device transmits, at a first time instant, a first data signal $S_1$ over a first data stream using a first frequency and a second data signal $S_2$ over a second data stream using the first frequency; the transmitting device transmits, at a second time instant after the first time instant, a negative conjugate of the second data signal (that is, the third data signal $-S_2^*$) over the first data stream using the first frequency and a conjugate of the first data signal (that is, the fourth data signal $S_1^*$) over the second data stream using the first frequency, and the at least one receiving device then parses out the first data signal and the second data signal according to the received data signals transmitted at the two time instants. Alternatively, the transmitting device transmits, at a first time instant, a first data signal $S_1$ over a first data stream using a first frequency and a second data signal $S_2$ over a second data stream using the first frequency, which transmits a negative conjugate of the second data signal $S_2$ (that is, the third data signal $-S_2^*$) over the first data stream using a second frequency and a conjugate of the first data signal $S_1$ (that is, the fourth data signal $S_1^*$) over the second data stream using the second frequency, and the at least one receiving device then parses out the first data signal and the second data signal in data streams according to the received data streams transmitted via different frequencies at the same time instant.

It should be understood that the transmitting device transmits a first TB set to the at least one receiving device. The first TB set may include one or more TBs, and correspondingly, a second TB set may also include one or more TBs. In an embodiment, for a case where the first TB set includes only one TB, that is, a first TB, the first data stream and the second data stream are mapped to the first TB, and correspondingly, for a case where the second TB set includes only a second TB, the third data stream and the fourth data stream are mapped to the second TB. At this time, the at least one receiving device includes one receiving device. For example, for downlink data transmission, the transmitting device may be a base station, and the receiving device may be a terminal device; alternatively, for uplink data transmission, the transmitting device may be a terminal device, and the receiving device may be a base station.

Specifically, the transmitting device transmits a first TB to the receiving device, where the first TB is mapped with a first data stream and a second data stream, and a data signal retransmission is necessary when the receiving device receives the first TB erroneously. As shown in the second column of FIG. 2, the transmitting device transmits a third data signal over a third data stream and a fourth data signal over a fourth data stream, where the third data signal is equal to a negative conjugate of the second data signal $S_2$ ($-S_2^*$), the fourth data signal is equal to a conjugate of the first data signal $S_1$ ($S_1^*$), and the third data stream and the fourth data stream are both mapped to a second TB in the second TB set. Correspondingly, the receiving device parses out the first data signal and the second data signal according to the first TB in which the error occurs and the second TB received after the retransmission.

It should be understood that when a retransmission is required due to an error in a TB, the base station may transmit indication information to the terminal device either in an uplink data transmission or a downlink data transmission, where the indication information is used to indicate that the terminal device and the base station use a method in embodiments of the present disclosure to perform data signal retransmission.

In an embodiment, for a case with a plurality of TBs included in the first TB set, description is made by taking an example that the first TB set includes a first TB and a second TB, and correspondingly, the second TB set includes a third TB and a fourth TB, then the at least one receiving device may include one or two receiving devices. Description is made by taking an example that the at least one receiving device includes one receiving device, that is, the transmitting device transmits a first data stream and a second data stream to the receiving device, where the first data stream and the second data stream are mapped to different TBs, that is, the first data stream is mapped to the first TB and the second data stream is mapped to the second TB. For example, for a downlink data transmission, the transmitting device may be a base station, and the receiving device may be a terminal device; alternatively, for an uplink data transmission, the transmitting device may be a terminal device, and the receiving device may be a base station.

When an error occurs in the first TB or the second TB, or an error occurs in both the first TB and the second TB, the transmitting device needs to retransmit a data signal to the receiving device, accordingly, as shown in FIG. 2, the transmitting device transmits a third data signal over a third data stream and a fourth data signal over a fourth data stream, where the third data signal is equal to a negative conjugate of the second data signal $S_2$ ($-S_2^*$), the fourth data signal is equal to a conjugate of the first data signal $S_1$ ($S_1^*$), the third data stream is mapped to a third TB in the second TB set, and the fourth data stream is mapped to a fourth TB in the second TB set. Correspondingly, the receiving device parses out the first data signal and the second data signal according to the data signals on the data streams mapped in the first TB set and the second TB set.

It should be understood that when a retransmission is required due to an error in a TB, the base station may transmit indication information to the terminal device either in an uplink data transmission or a downlink data transmission, where the indication information is used to indicate that the terminal device and the base station use a method in embodiments of the present disclosure to perform data signal retransmission.

In an embodiment, for a case with a first TB and a second TB included in the first TB set, correspondingly, the second TB set includes a third TB and a fourth TB. Then, the at least one receiving device may include two receiving devices, for example, the transmitting device is a base station, and the receiving device includes a first terminal device and a second terminal device, that is, one base station transmits data signals to two terminal devices.

Specifically, the base station transmits a first TB to the first terminal device and a second TB to the second terminal device, where the first TB is mapped with a first data stream, the second TB is mapped with a second data stream, and the first data stream and the second data stream are used to transmit data signals. For example, the first data signal may be transmitted over the first data stream, and the second data signal may be transmitted over the second data stream, so that the first terminal obtains the first data signal and the second terminal obtains the second data signal.

When an error occurs in any one of the two TBs in the first TB set, or an error occurs in both TBs, the base station needs to retransmit data signals to the two terminal devices. Specifically, during the retransmission, the base station transmits a third TB to the first terminal device, where the third TB is mapped with a third data stream for transmitting a third data signal to the first terminal, and the third data signal is equal to a negative conjugate of the second data signal $S_2$ ($-S_2^*$); correspondingly, the base station transmits a fourth TB to the second terminal, the fourth TB is mapped with a fourth data stream for transmitting a fourth data signal to the second terminal, and the fourth data signal is equal to a conjugate of the first data signal $S_1$ ($S_1^*$). Then, the first terminal device obtains the first data signal according to the first TB and the third TB; and the terminal device obtains the second data signal according to the second TB and the fourth TB.

It should be understood that when a retransmission is required due to errors in TBs transmitted by the base station to the two terminal devices, the base station may transmit indication information to the two terminal devices separately, where the indication information is used to indicate that the two terminal devices and the base station use a method in embodiments of the present disclosure to perform data signal retransmission.

Therefore, according to the data transmission method in the embodiment of the present application, the transmitting device transmits a first data signal and a second data signal over a first TB set, and transmits a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

FIG. 7 shows a schematic flow chart of a data transmission method 600 according to still another embodiment of the present disclosure. The method 600 can be applied to a communication system including a transmitting device and at least one receiving device, which may be performed by any one of the at least one receiving device. Specifically, the receiving device may be a base station or a terminal device, and the embodiment of the present disclosure is not limited thereto. As shown in FIG. 7, the method 600 includes:

S610: a first receiving device receives a first transmission block set transmitted by the transmitting device to the at least one receiving device, where a transmission block in the first transmission block set is mapped with a first data stream and a second data stream, the first data stream and the second data stream are used to transmit a data signal including a first data signal and a second data signal, and the first receiving device is any one of the at least one receiving device; and S620: when the transmission block in the first transmission block set is transmitted erroneously, the first receiving device receives a second transmission block set transmitted by the transmitting device to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal.

In an embodiment, the first data stream is used to transmit the first data signal and the second data stream is used to transmit the second data signal.

In an embodiment, the first data stream is used to transmit, at a first time instant, the first data signal using a first frequency and the third data signal using a second frequency; and the second data stream is used to transmit, at the first time instant, the second data signal using the first frequency and the fourth data signal using the second frequency.

In an embodiment, the first data stream is used to transmit, at a first time instant, the first data signal using a first frequency, and transmit, at a second time instant, the third data signal using the first frequency; and the second data stream is used to transmit, at the first time instant, the second data signal using the first frequency, and transmit, at the second time instant, the fourth data signal using the first frequency.

In an embodiment, the first TB set includes a first TB to which the first data stream and the second data stream are both mapped, and the second TB set includes a second TB to which the third data stream and the fourth data stream are both mapped.

In an embodiment, the first TB set includes a first TB to which the first data stream is mapped and a second TB to which the second data stream is mapped, the second TB set includes a third TB to which the third data stream is mapped and a fourth TB to which the fourth data stream is mapped.

In an embodiment, the at least one receiving device includes the first terminal device and a second terminal device, and the transmitting device is a base station; the receiving, by the first receiving device, the first TB set transmitted by the transmitting device to the at least one receiving device includes: the first terminal device receives the first TB transmitted by the base station, where the second TB is transmitted by the base station to the second terminal device; the receiving, by the first receiving device, the second TB set transmitted by the transmitting device to the at least one receiving device includes: the first terminal device receives the third TB transmitted by the base station, where the fourth TB is transmitted by the base station to the second terminal device, the first TB and the third TB are used by the first terminal device to determine the first data signal, and the second TB and the fourth TB are used by the second terminal device to determine the second data signal.

In an embodiment, the first receiving device is a base station, and the transmitting device is a terminal device; or the first receiving device is a terminal device, and the transmitting device is a base station.

In an embodiment, the method further includes: the terminal device receives indication information transmitted by the base station, where the indication information is used to indicate a retransmission mode used by the terminal device when a TB is transmitted erroneously.

It should be understood that the method 600 corresponds to the method 500 in the embodiments of the present disclosure, and for the method 600, steps at the receiving device in the method 500 may be performed accordingly, thus details will not be described herein again.

Therefore, according to the data transmission method in the embodiment of the present application, the receiving device receives a first data signal and a second data signal transmitted by the transmitting device over a first TB set, and then receives a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

It should be understood that, in various embodiments of the present disclosure, sequence numbers of the above processes do not mean an execution order, and the execution order of each process should be determined by its function and internal logic rather than being intended to limit implementations in the embodiments of the present disclosure.

A data transmission method according to an embodiment of the present disclosure has been described above in detail in conjunction with FIG. 1 to FIG. 7, and a data transmission apparatus according to an embodiment of the present disclosure will be described below in conjunction with FIG. 8 to FIG. 15.

As shown in FIG. 8, a transmitting device 700 according to an embodiment of the present disclosure includes:

a transmitting module 710, configured to transmit, at a first time instant, a first data signal to a receiving device over a first data stream using a first frequency and a second data signal to the receiving device over a second data stream using the first frequency, the transmitting module 710 is further configured to transmit, at a second time instant after the first time instant, a third data signal to the receiving device over the first data stream using the first frequency and a fourth data signal to the receiving device over the second data stream using the first frequency, where the third data signal is equal to a negative conjugate of the second data signal, the fourth data signal is equal to a conjugate of the first data signal, and the first data stream and the second data stream are used by the receiving device to determine the first data signal and the second data signal;

or the transmitting module 710 is configured to transmit, at a first time instant, a first data signal to the receiving device over a first data stream using a first frequency and a second data signal to the receiving device over a second data stream using the first frequency, the transmitting module 710 is further configured to transmit, at the first time instant, a third data signal to the receiving device over the first data stream using a second frequency and a fourth data signal to the receiving device over the second data stream using the second frequency, where the third data signal is equal to a negative conjugate of the second data signal, the fourth data signal is equal to a conjugate of the first data signal, and the first data stream and the second data stream are used by the receiving device to determine the first data signal and the second data signal.

Therefore, according to the transmitting device in the embodiment of the present disclosure, efficiency of data transmission can be improved by transmitting, at different time instants, a first data stream carrying a first data signal and a second data stream carrying a second data signal to a receiving device using the same frequency, or transmitting, at the same time instant, the first data stream carrying the first data signal and the second data stream carrying the second data signal to the receiving device using different frequencies.

In an embodiment, the first data stream and the second data stream are mapped to a same transmission block.

In an embodiment, the transmitting device is a terminal device, and the receiving device is a base station; or the transmitting device is a base station, and the receiving device is a terminal device.

In an embodiment, the base station is configured to transmit indication information to the terminal device, where the indication information is used to indicate a mode for transmission of a data signal between the terminal device and the base station.

In an embodiment, the base station includes a first base station including a first transmitting unit and a second base station including a second transmitting unit when the transmitting device is the base station, and the transmitting module 710 includes the first transmitting unit and the second transmitting unit, the first transmitting unit is configured to transmit a data signal in the first data stream, and the second transmitting unit is configured to transmit a data signal in the second data stream.

It should be understood that the transmitting device 700 according to the embodiment of the present disclosure may perform the method 100 and the method 200 in embodiments of the present disclosure accordingly, the above-described and other operations and/or functions of the respective modules in the transmitting device 700 aim to implement corresponding processes of the methods in FIG. 1 and FIG. 3 pertaining to the transmitting device, respectively. For the sake of brevity, details will not be described herein again.

Therefore, according to the transmitting device in the embodiment of the present disclosure, efficiency of data transmission can be improved by transmitting, at different time instants, a first data stream carrying a first data signal and a second data stream carrying a second data signal to a receiving device using the same frequency, or transmitting, at the same time instant, the first data stream carrying the first data signal and the second data stream carrying the second data signal to the receiving device using different frequencies.

As shown in FIG. 9, a receiving device 800 according to an embodiment of the present disclosure includes:

a receiving module 810, configured to receive, at a first time instant, a first data signal transmitted by a transmitting device over a first data stream using a first frequency and a second data signal transmitted by the transmitting device over a second data stream using the first frequency, the receiving module 810 is further configured to receive, at a second time instant after the first time instant, a third data signal transmitted by the transmitting device over the first data stream using the first frequency and a fourth data signal transmitted by the transmitting device over the second data stream using the first frequency, where the third data signal is equal to a negative conjugate of the second data signal, and the fourth data signal is equal to a conjugate of the first data signal, and a determining module 820, configured to determine the first data signal and the second data signal according to the first data stream and the second data stream; or the receiving module 810 is configured to receive, at a first time instant, a first data signal transmitted by the transmitting device over a first data stream using a first frequency and a second data signal transmitted by the transmitting device over a second data stream using the first frequency, the receiving module 810 is further configured to receive, at the first time instant, a third data signal transmitted by the transmitting device over the first data stream using a second frequency and a fourth data signal transmitted by the transmitting device over the second data stream using the second frequency, where the third data signal is equal to a negative conjugate of the second data signal, and the fourth data signal is equal to a conjugate of the first data signal, and the determining module 820 is configured to determine the first data signal and the second data signal according to the first data stream and the second data stream.

Therefore, according to the receiving device in the embodiment of the present disclosure, efficiency of data transmission can be improved by receiving a first data stream carrying a first data signal and a second data stream carrying a second data signal transmitted by the transmitting device at different time instants using the same frequency, or a first data stream carrying a first data signal and a second data stream carrying a second data signal transmitted by the transmitting device at the same time instant using different frequencies.

In an embodiment, the first data stream and the second data stream are mapped to a same transmission block.

In an embodiment, the receiving device is a base station, and the transmitting device is a terminal device; or the receiving device is a terminal device, and the transmitting device is a base station.

In an embodiment, the terminal device is configured to receive indication information transmitted by the base station, where the indication information is used to indicate a mode for transmission of a data signal between the terminal device and the base station.

In an embodiment, the base station includes a first base station and a second base station when the transmitting device is the base station, the first base station is configured to transmit a data signal in the first data stream, and the second base station is configured to transmit a data signal in the second data stream.

It should be understood that the receiving device 800 according to the embodiment of the present disclosure may perform the method 300 and the method 400 in embodiments of the present disclosure accordingly, the above-described and other operations and/or functions of the respective modules in the receiving device 800 aim to implement corresponding processes of the methods in FIG. 4 to FIG. 5 pertaining to the receiving device, respectively. For the sake of brevity, details will not be described herein again.

Therefore, according to the receiving device in the embodiment of the present disclosure, efficiency of data transmission can be improved by receiving a first data stream carrying a first data signal and a second data stream carrying a second data signal transmitted by the transmitting device at different time instants using the same frequency, or a first data stream carrying a first data signal and a second data stream carrying a second data signal transmitted by the transmitting device at the same time instant using different frequencies.

Figure 10:
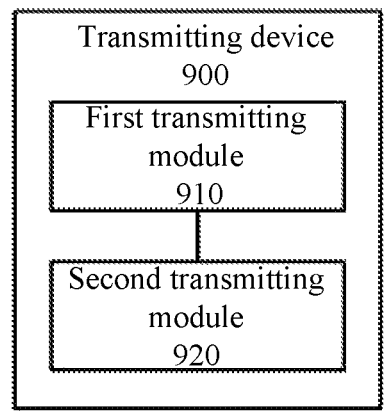
FIG. 10 is a schematic block diagram of a transmitting device according to another embodiment of the present disclosure.

As shown in FIG. 10, a transmitting device 900 according to another embodiment of the present disclosure includes:

a first transmitting module 910, configured to transmit a first transmission block set to at least one receiving device, where a transmission block in the first transmission block set is mapped with a first data stream and the second data stream, and the first data stream and the second data stream are used to transmit a data signal including a first data signal and a second data signal; and a second transmitting module 920, configured to: when the transmission block in the first transmission block set is transmitted erroneously, transmit a second transmission block set to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal.

Therefore, the transmitting device in the embodiment of the present application transmits a first data signal and a second data signal over a first TB set, and transmits a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

In an embodiment, the first data stream is used to transmit the first data signal and the second data stream is used to transmit the second data signal.

In an embodiment, the first data stream is used to transmit, at a first time instant, the first data signal using a first frequency and the third data signal using a second frequency; and the second data stream is used to transmit, at the first time instant, the second data signal using the first frequency and the fourth data signal using the second frequency.

In an embodiment, the first data stream is used to transmit, at a first time instant, the first data signal using a first frequency, and transmit, at a second time instant, the third data signal using the first frequency; and the second data stream is used to transmit, at the first time instant, the second data signal using the first frequency, and transmit, at the second time instant, the fourth data signal using the first frequency.

In an embodiment, the first transmission block set includes a first transmission block to which the first data stream and the second data stream are both mapped, and the second transmission block set includes a second transmission block to which the third data stream and the fourth data stream are both mapped.

In an embodiment, the first transmission block set includes a first transmission block to which the first data stream is mapped and a second transmission block to which the second data stream is mapped, the second transmission block set includes a third transmission block to which the third data stream is mapped and a fourth transmission block to which the fourth data stream is mapped.

In an embodiment, the transmitting device is a base station, and the at least one receiving device includes a first terminal device and a second terminal device, the first transmitting module 910 is specifically configured to: transmit the first transmission block to the first terminal device and the second transmission block to the second terminal device; the second transmitting module 920 is specifically configured to: transmit the third transmission block to the first terminal device and the fourth transmission block to the second terminal device, where the first transmission block and the third transmission block are used by the first terminal device to determine the first data signal, and the second transmission block and the fourth transmission block are used by the second terminal device to determine the second data signal.

In an embodiment, the transmitting device is a terminal device, and the at least one receiving device is a base station; or the transmitting device is a base station, and the at least one receiving device is a terminal device.

In an embodiment, the base station is configured to transmit indication information to the terminal device, where the indication information is used to indicate a retransmission mode used by the terminal device when a transmission block is transmitted erroneously.

It should be understood that the transmitting device 900 according to the embodiment of the present disclosure may perform the method 500 in the embodiment of the present disclosure accordingly, the above-described and other operations and/or functions of the respective modules in the transmitting device 900 aim to implement corresponding processes of the method in FIG. 6 pertaining to the transmitting device, respectively. For the sake of brevity, details will not be described herein again.

Therefore, the transmitting device in the embodiment of the present application transmits a first data signal and a second data signal over a first TB set, and transmits a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

Figure 11:
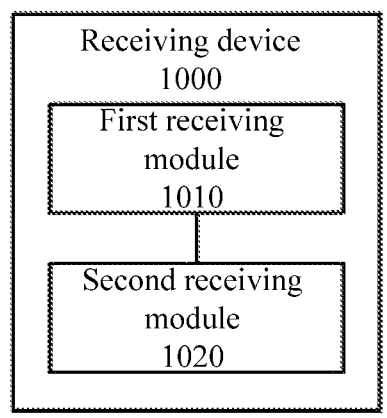
FIG. 11 is a schematic block diagram of a receiving device according to another embodiment of the present disclosure.

FIG. 11 shows a schematic block diagram of a receiving device 1000 according to another embodiment of the present disclosure. The receiving device 1000 resides in a communication system including a transmitting device and at least one receiving device, which is any one of the at least one receiving device. As shown in FIG. 11, the receiving device 1000 includes:

a first receiving module 1010, configured to receive a first transmission block set transmitted by the transmitting device to the at least one receiving device, where a transmission block in the first transmission block set is mapped with a first data stream and a second data stream, the first data stream and the second data stream are used to transmit a data signal including a first data signal and a second data signal; and a second receiving module 1020, configured to: when the transmission block in the first transmission block set is transmitted erroneously, receive a second transmission block set transmitted by the transmitting device to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal.

Therefore, the receiving device in the embodiment of the present application receives a first data signal and a second data signal transmitted by the transmitting device over a first TB set, and then receives a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

In an embodiment, the first data stream is used to transmit the first data signal and the second data stream is used to transmit the second data signal.

In an embodiment, the first data stream is used to transmit, at a first time instant, the first data signal using a first frequency and the third data signal using a second frequency; and the second data stream is used to transmit, at the first time instant, the second data signal using the first frequency and the fourth data signal using the second frequency.

In an embodiment, the first data stream is used to transmit, at a first time instant, the first data signal using a first frequency, and transmit, at a second time instant, the third data signal using the first frequency; and the second data stream is used to transmit, at the first time instant, the second data signal using the first frequency, and transmit, at the second time instant, the fourth data signal using the first frequency.

In an embodiment, the first transmission block set includes a first transmission block to which the first data stream and the second data stream are both mapped, and the second transmission block set includes a second transmission block to which the third data stream and the fourth data stream are both mapped.

In an embodiment, the first transmission block set includes a first transmission block to which the first data stream is mapped and a second transmission block to which the second data stream is mapped, the second transmission block set includes a third transmission block to which the third data stream is mapped and a fourth transmission block to which the fourth data stream is mapped.

In an embodiment, the at least one receiving device includes the first terminal device and a second terminal device, and the transmitting device is a base station, the first receiving module 1010 is specifically configured to: receive the first transmission block transmitted by the base station, where the second transmission block is transmitted by the base station to the second terminal device; the second receiving module 1020 is specifically configured to: receive the third transmission block transmitted by the base station, where the fourth transmission block is transmitted by the base station to the second terminal device, the first transmission block and the third transmission block are used by the first terminal device to determine the first data signal, and the second transmission block and the fourth transmission block are used by the second terminal device to determine the second data signal.

In an embodiment, the receiving device is a base station, and the transmitting device is a terminal device; or the receiving device is a terminal device, and the transmitting device is a base station.

In a embodiment, the terminal device is configured to receive indication information transmitted by the base station, where the indication information is used to indicate a retransmission mode used by the terminal device when a transmission block is transmitted erroneously.

It should be understood that the receiving device 1000 according to the embodiment of the present disclosure may perform the method 600 in the embodiment of the present disclosure accordingly, the above-described and other operations and/or functions of the respective modules in the receiving device 1000 aim to implement corresponding processes of the method in FIG. 7 pertaining to the receiving device, respectively. For the sake of brevity, details will not be described herein again.

Therefore, the receiving device in the embodiment of the present application receives a first data signal and a second data signal transmitted by the transmitting device over a first TB set, and then receives a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

Figure 12:
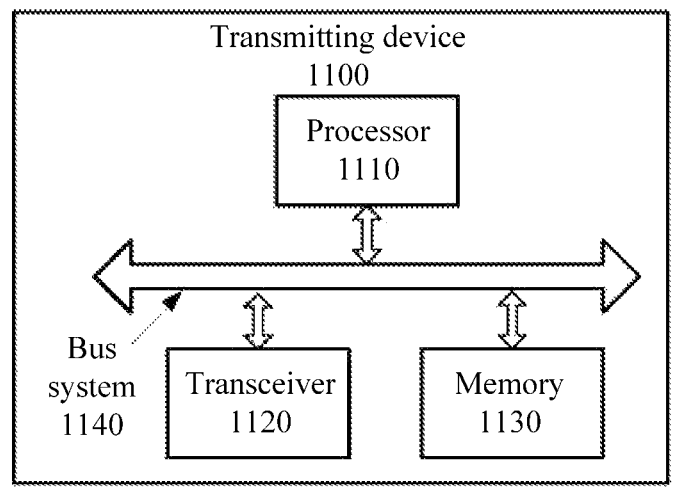
FIG. 12 is a schematic block diagram of a transmitting device according to still another embodiment of the present disclosure.

FIG. 12 shows a schematic block diagram of a transmitting device 1100 according to still another embodiment of the present disclosure. As shown in FIG. 12, the transmitting device 1100 includes a processor 1110 and a transceiver 1120 connected to each other. In an embodiment, the transmitting device 1100 further includes a memory 1130, and the memory 1130 and the processor 1110 are connected to each other. Further, in an embodiment, the transmitting device 1100 includes a bus system 1140. The processor 1110, the memory 1130, and the transceiver 1120 may be connected via the bus system 1140, where the memory 1130 may be configured to store instructions, and the processor 1110 is configured to execute the instructions stored in the memory 1130 to control the transceiver 1120 to transmit information or signals, the transceiver 1120 is configured to transmit, at a first time instant, a first data signal to a receiving device over a first data stream using a first frequency and a second data signal to the receiving device over a second data stream using the first frequency, the transceiver 1120 is further configured to transmit, at a second time instant after the first time instant, a third data signal to the receiving device over the first data stream using the first frequency and a fourth data signal to the receiving device over the second data stream using the first frequency, where the third data signal is equal to a negative conjugate of the second data signal, the fourth data signal is equal to a conjugate of the first data signal, and the first data stream and the second data stream are used by the receiving device to determine the first data signal and the second data signal;

or the transceiver 1120 is configured to transmit, at a first time instant, a first data signal to the receiving device over a first data stream using a first frequency and a second data signal to the receiving device over a second data stream using the first frequency, the transceiver 1120 is further configured to transmit, at the first time instant, a third data signal to the receiving device over the first data stream using a second frequency and a fourth data signal to the receiving device over the second data stream using the second frequency, where the third data signal is equal to a negative conjugate of the second data signal, the fourth data signal is equal to a conjugate of the first data signal, and the first data stream and the second data stream are used by the receiving device to determine the first data signal and the second data signal.

Therefore, according to the transmitting device in the embodiment of the present disclosure, efficiency of data transmission can be improved by transmitting, at different time instants, a first data stream carrying a first data signal and a second data stream carrying a second data signal to a receiving device using the same frequency, or transmitting, at the same time instant, the first data stream carrying the first data signal and the second data stream carrying the second data signal to the receiving device using different frequencies.

In an embodiment, the first data stream and the second data stream are mapped to a same transmission block.

In an embodiment, the transmitting device is a terminal device, and the receiving device is a base station; or the transmitting device is a base station, and the receiving device is a terminal device.

In an embodiment, the base station is configured to transmit indication information to the terminal device, where the indication information is used to indicate a mode for transmission of a data signal between the terminal device and the base station.

In an embodiment, the base station includes a first base station including a first transmitting unit and a second base station including a second transmitting unit when the transmitting device is the base station, and the transceiver 1120 includes the first transmitting unit and the second transmitting unit, the first transmitting unit is configured to transmit a data signal in the first data stream, and the second transmitting unit is configured to transmit a data signal in the second data stream.

It should be understood that the transmitting device 1100 according to the embodiment of the present disclosure may correspond to the transmitting device 700 in the embodiment of the present disclosure, and may correspond to corresponding bodies performing the method 100 and the method 200 in embodiments of the present disclosure, the above-described and other operations and/or functions of the respective modules in the transmitting device 1100 aim to implement corresponding processes of the methods in FIG. 1 and FIG. 3, respectively. For the sake of brevity, details will not be described herein again.

Therefore, according to the transmitting device in the embodiment of the present disclosure, efficiency of data transmission can be improved by transmitting, at different time instants, a first data stream carrying a first data signal and a second data stream carrying a second data signal to a receiving device using the same frequency, or transmitting, at the same time instant, the first data stream carrying the first data signal and the second data stream carrying the second data signal to the receiving device using different frequencies.

Figure 13:
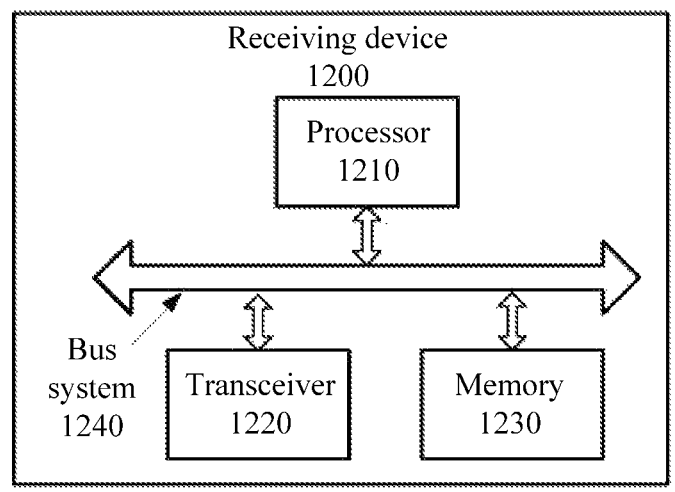
FIG. 13 is a schematic block diagram of a receiving device according to still another embodiment of the present disclosure.

FIG. 13 shows a schematic block diagram of a receiving device 1200 according to still another embodiment of the present disclosure. As shown in FIG. 13, the receiving device 1200 includes a processor 1210 and a transceiver 1220 connected to each other. In an embodiment, the receiving device 1200 further includes a memory 1230, and the memory 1230 and the processor 1210 are connected to each other. Further, in an embodiment, the receiving device 1200 includes a bus system 1240. The processor 1210, the memory 1230, and the transceiver 1220 may be connected via the bus system 1240, where the memory 1230 may be configured to store instructions, and the processor 1210 is configured to execute the instructions stored in the memory 1230 to control the transceiver 1220 to transmit information or signals, the transceiver 1220 is configured to receive, at a first time instant, a first data signal transmitted by a transmitting device over a first data stream using a first frequency and a second data signal transmitted by the transmitting device over a second data stream using the first frequency, the transceiver 1220 is further configured to receive, at a second time instant after the first time instant, a third data signal transmitted by the transmitting device over the first data stream using the first frequency and a fourth data signal transmitted by the transmitting device over the second data stream using the first frequency, where the third data signal is equal to a negative conjugate of the second data signal, and the fourth data signal is equal to a conjugate of the first data signal, and the processor 1220 is configured to determine the first data signal and the second data signal according to the first data stream and the second data stream;

or the transceiver 1220 is configured to receive, at a first time instant, a first data signal transmitted by the transmitting device over a first data stream using a first frequency and a second data signal transmitted by the transmitting device over a second data stream using the first frequency, the transceiver 1220 is further configured to receive, at the first time instant, a third data signal transmitted by the transmitting device over the first data stream using a second frequency and a fourth data signal transmitted by the transmitting device over the second data stream using the second frequency, where the third data signal is equal to a negative conjugate of the second data signal, and the fourth data signal is equal to a conjugate of the first data signal, and the processor 1210 is configured to determine the first data signal and the second data signal according to the first data stream and the second data stream.

Therefore, according to the receiving device in the embodiment of the present disclosure, efficiency of data transmission can be improved by receiving a first data stream carrying a first data signal and a second data stream carrying a second data signal transmitted by the transmitting device at different time instants using the same frequency, or a first data stream carrying a first data signal and a second data stream carrying a second data signal transmitted by the transmitting device at the same time instant using different frequencies.

In an embodiment, the first data stream and the second data stream are mapped to a same transmission block.

In an embodiment, the receiving device is a base station, and the transmitting device is a terminal device; or the receiving device is a terminal device, and the transmitting device is a base station.

In an embodiment, the terminal device is configured to receive indication information transmitted by the base station, where the indication information is used to indicate a mode for transmission of a data signal between the terminal device and the base station.

In an embodiment, the base station includes a first base station and a second base station when the transmitting device is the base station, the first base station is configured to transmit a data signal in the first data stream, and the second base station is configured to transmit a data signal in the second data stream.

It should be understood that the receiving device 1200 according to the embodiment of the present disclosure may correspond to the receiving device 800 in the embodiment of the present disclosure, and may correspond to corresponding bodies performing the method 300 and the method 400 in embodiments of the present disclosure, the above-described and other operations and/or functions of the respective modules in the receiving device 1200 aim to implement corresponding processes of the methods in FIG. 4 to FIG. 5, respectively. For the sake of brevity, details will not be described herein again.

Therefore, according to the receiving device in the embodiment of the present disclosure, efficiency of data transmission can be improved by receiving a first data stream carrying a first data signal and a second data stream carrying a second data signal transmitted by the transmitting device at different time instants using the same frequency, or a first data stream carrying a first data signal and a second data stream carrying a second data signal transmitted by the transmitting device at the same time instant using different frequencies.

Figure 14:
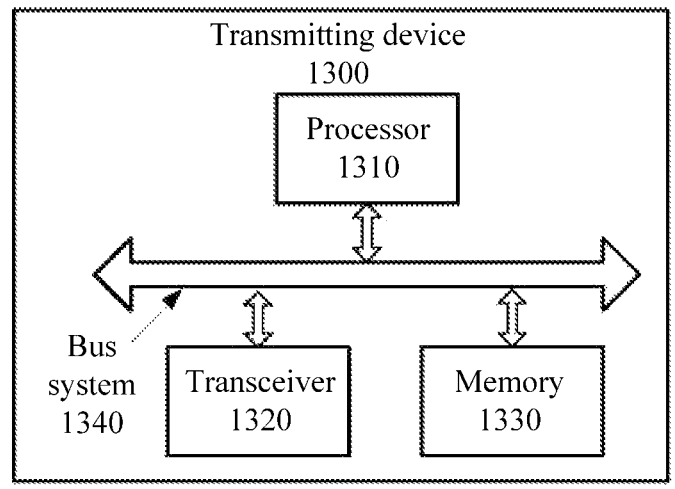
FIG. 14 is a schematic block diagram of a transmitting device according to still another embodiment of the present disclosure.

FIG. 14 shows a schematic block diagram of a transmitting device 1300 according to still another embodiment of the present disclosure. As shown in FIG. 14, the transmitting device 1300 includes a processor 1310 and a transceiver 1320 connected to each other. In an embodiment, the transmitting device 1300 further includes a memory 1330, and the memory 1330 and the processor 1310 are connected to each other. Further, in an embodiment, the transmitting device 1300 includes a bus system 1340. The processor 1310, the memory 1330, and the transceiver 1320 may be connected via the bus system 1340, where the memory 1330 may be configured to store instructions, and the processor 1310 is configured to execute the instructions stored in the memory 1330 to control the transceiver 1320 to transmit information or signals.

The transceiver 1320 is configured to: transmit a first transmission block set to at least one receiving device, where a transmission block in the first transmission block set is mapped with a first data stream and the second data stream, and the first data stream and the second data stream are used to transmit a data signal including a first data signal and a second data signal; and when the transmission block in the first transmission block set is transmitted erroneously, transmit a second transmission block set to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal.

Therefore, the transmitting device in the embodiment of the present application transmits a first data signal and a second data signal over a first TB set, and transmits a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

In an embodiment, the first data stream is used to transmit the first data signal and the second data stream is used to transmit the second data signal.

In an embodiment, the first data stream is used to transmit, at a first time instant, the first data signal using a first frequency and the third data signal using a second frequency; and the second data stream is used to transmit, at the first time instant, the second data signal using the first frequency and the fourth data signal using the second frequency.

In an embodiment, the first data stream is used to transmit, at a first time instant, the first data signal using a first frequency, and transmit, at a second time instant, the third data signal using the first frequency; and the second data stream is used to transmit, at the first time instant, the second data signal using the first frequency, and transmit, at the second time instant, the fourth data signal using the first frequency.

In an embodiment, the first transmission block set includes a first transmission block to which the first data stream and the second data stream are both mapped, and the second transmission block set includes a second transmission block to which the third data stream and the fourth data stream are both mapped.

In an embodiment, the first transmission block set includes a first transmission block to which the first data stream is mapped and a second transmission block to which the second data stream is mapped, the second transmission block set includes a third transmission block to which the third data stream is mapped and a fourth transmission block to which the fourth data stream is mapped.

In an embodiment, the transmitting device is a base station, and the at least one receiving device includes a first terminal device and a second terminal device, the transceiver 1320 is specifically configured to: transmit the first transmission block to the first terminal device and the second transmission block to the second terminal device; and transmit the third transmission block to the first terminal device and the fourth transmission block to the second terminal device, where the first transmission block and the third transmission block are used by the first terminal device to determine the first data signal, and the second transmission block and the fourth transmission block are used by the second terminal device to determine the second data signal.

In an embodiment, the transmitting device is a terminal device, and the at least one receiving device is a base station; or the transmitting device is a base station, and the at least one receiving device is a terminal device.

In an embodiment, the base station is configured to transmit indication information to the terminal device, where the indication information is used to indicate a retransmission mode used by the terminal device when a transmission block is transmitted erroneously.

It should be understood that the transmitting device 1300 according to the embodiment of the present disclosure may correspond to the transmitting device 900 in the embodiment of the present disclosure, and may correspond to a corresponding body performing the method 500 in the embodiment of the present disclosure, the above-described and other operations and/or functions of the respective modules in the transmitting device 1300 aim to implement corresponding processes of the method in FIG. 6, respectively. For the sake of brevity, details will not be described herein again.

Therefore, the transmitting device in the embodiment of the present application transmits a first data signal and a second data signal over a first TB set, and transmits a third data stream and a fourth data stream over a TB in a second TIB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

Figure 15:
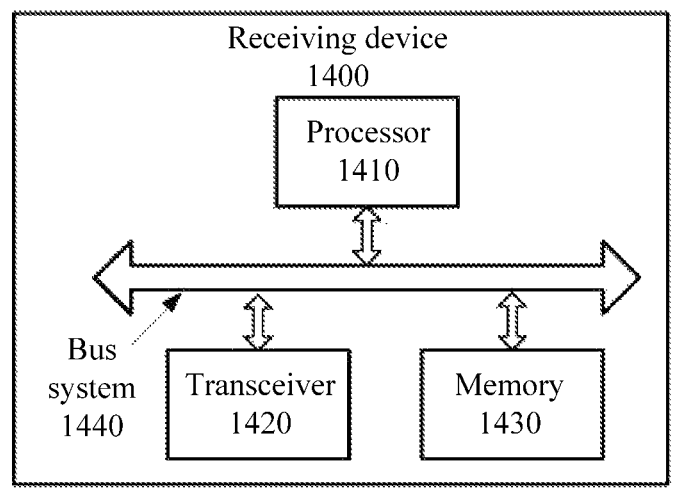
FIG. 15 is a schematic block diagram of a receiving device according to still another embodiment of the present disclosure.

FIG. 15 shows a schematic block diagram of a receiving device 1400 according to still another embodiment of the present disclosure. The receiving device 1400 resides in a communication system including a transmitting device and at least one receiving device, which is any one of the at least one receiving device. As shown in FIG. 15, the receiving device 1400 includes a processor 1410 and a transceiver 1420 connected to each other. In an embodiment, the receiving device 1400 further includes a memory 1430, and the memory 1430 and the processor 1410 are connected to each other. Further, in an embodiment, the receiving device 1400 includes a bus system 1440. The processor 1410, the memory 1430, and the transceiver 1420 may be connected via the bus system 1440, where the memory 1430 may be configured to store instructions, and the processor 1410 is configured to execute the instructions stored in the memory 1430 to control the transceiver 1420 to transmit information or signals.

The transceiver 1420 is configured to: receive a first transmission block set transmitted by the transmitting device to the at least one receiving device, where a transmission block in the first transmission block set is mapped with a first data stream and a second data stream, the first data stream and the second data stream are used to transmit a data signal including a first data signal and a second data signal; and when the transmission block in the first transmission block set is transmitted erroneously, receive a second transmission block set transmitted by the transmitting device to the at least one receiving device, where a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal.

Therefore, the receiving device in the embodiment of the present application receives a first data signal and a second data signal transmitted by the transmitting device over a first TB set, and then receives a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

In an embodiment, the first data stream is used to transmit the first data signal and the second data stream is used to transmit the second data signal.

In an embodiment, the first data stream is used to transmit, at a first time instant, the first data signal using a first frequency and the third data signal using a second frequency; and the second data stream is used to transmit, at the first time instant, the second data signal using the first frequency and the fourth data signal using the second frequency.

In an embodiment, the first data stream is used to transmit, at a first time instant, the first data signal using a first frequency, and transmit, at a second time instant, the third data signal using the first frequency; and the second data stream is used to transmit, at the first time instant, the second data signal using the first frequency, and transmit, at the second time instant, the fourth data signal using the first frequency.

In an embodiment, the first transmission block set includes a first transmission block to which the first data stream and the second data stream are both mapped, and the second transmission block set includes a second transmission block to which the third data stream and the fourth data stream are both mapped.

In an embodiment, the first transmission block set includes a first transmission block to which the first data stream is mapped and a second transmission block to which the second data stream is mapped, the second transmission block set includes a third transmission block to which the third data stream is mapped and a fourth transmission block to which the fourth data stream is mapped.

In an embodiment, the at least one receiving device includes the first terminal device and a second terminal device, and the transmitting device is a base station, the transceiver 1420 is specifically configured to: receive the first transmission block transmitted by the base station, where the second transmission block is transmitted by the base station to the second terminal device; receive the third transmission block transmitted by the base station, where the fourth transmission block is transmitted by the base station to the second terminal device, the first transmission block and the third transmission block are used by the first terminal device to determine the first data signal, and the second transmission block and the fourth transmission block are used by the second terminal device to determine the second data signal.

In an embodiment, the receiving device is a base station, and the transmitting device is a terminal device; or the receiving device is a terminal device, and the transmitting device is a base station.

In an embodiment, the terminal device is configured to receive indication information transmitted by the base station, where the indication information is used to indicate a retransmission mode used by the terminal device when a transmission block is transmitted erroneously.

It should be understood that the receiving device 1400 according to the embodiment of the present disclosure may correspond to the receiving device 1000 in the embodiment of the present disclosure, and may correspond to a corresponding body performing the method 600 in the embodiment of the present disclosure accordingly, the above-described and other operations and/or functions of the respective modules in the receiving device 1400 aim to implement corresponding processes of the method in FIG. 7 pertaining to the receiving device, respectively. For the sake of brevity, details will not be described herein again.

Therefore, the receiving device in the embodiment of the present application receives a first data signal and a second data signal transmitted by the transmitting device over a first TB set, and then receives a third data stream and a fourth data stream over a TB in a second TB set when an error occurs in a TB in the first TB set, where a negative conjugate of the second data signal is transmitted over the third data stream, and a conjugate of the first data signal is transmitted over the fourth data stream, so that the receiving device obtains the first data signal and the second data signal according to the first TB set and the second TB set, and when an error occurs in data transmission, efficiency of the data transmission is further improved through the above retransmission mode.

It should be noted that the above method embodiments of the present disclosure can be applied to a processor or implemented by the processor. The processor may be an integrated circuit chip with signal processing capabilities. During implementations, each step of the foregoing method embodiments may be completed by an integrated logic circuit of hardware in the processor or an instruction in a form of software. The above processor may be a general-purpose processor, a digital signal processor (DSP), an application specific integrated circuit (ASIC), a field programmable gate array (FPGA) or other programmable logic devices, discrete gate or transistor logic devices, discrete hardware components. The methods, steps, and logical block diagrams disclosed in the embodiments of the present disclosure may be implemented or performed. The general purpose processor may be a microprocessor or the processor may also be any conventional processor or the like. The steps of the methods disclosed in the embodiments of the present disclosure may be directly implemented by the hardware decoding processor, or may be performed by a combination of hardware and software modules in the decoding processor. The software module may be located in a storage medium mature in the art, such as a random access memory, a flash memory, a read only memory, a programmable read only memory, an electrically erasable programmable memory, a register, or the like. The storage medium is located in the memory. The processor reads information in the memory and performs the steps of the above methods in combination with its hardware.

It can be understood that the memory in the embodiments of the present disclosure may be a volatile memory or a non-volatile memory, or may include both the volatile memory and the non-volatile memory. The non-volatile memory may be a read-only memory (ROM), a programmable read only memory (PROM), or an erasable programmable read only memory (EPROM), an electrically erasable programmable read only memory (EEPROM) or a flash memory. The volatile memory may be a random access memory (RAM), which is used as an external cache. By way of exemplary but not restrictive illustration, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct Rambus random access memory (DR RAM). It should be noted that the memories of the systems and methods described herein are intended to include, but are not limited to these and any other suitable types of memories.

It should be understood that the term such as "and/or" herein is merely an association between associated objects, which indicates that there may be three relationships, for example, A and/or B may indicate presence of A only, of both A and B, and of B only. In addition, the character "/" herein generally indicates that contextual objects have an "or" relationship.

It may be known to persons of ordinary skill in the art that, the units and the algorithm steps of each example that are described with reference to the embodiments disclosed herein may be implemented by electronic hardware or a combination of electronic hardware and computer software. The situation whether these functions are performed by hardware or software depends on specific applications and design constraints of the technical solution. Persons skilled in the art may implement the described functions by using different methods for each specific application, and such implementation should not be regarded as going beyond the scope of the present disclosure.

It may be clearly understood by a person skilled in the art that, for the purpose of convenient and brief description, reference may be made to the corresponding process in the foregoing method embodiments for detailed working processes of the foregoing systems, apparatuses, and units, and details will not be described herein again.

In several embodiments provided in the present application, it should be understood that the disclosed systems, apparatuses, and methods may be implemented in other manners. For example, the described apparatus embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. A part or all of the units may be selected according to actual needs to achieve the objectives of the scheme in the embodiments.

In addition, functional units in the embodiments of the present disclosure may be integrated into one processing unit, or each of the units may exist alone physically, or two or more units are integrated into one unit.

If implemented in a form of a software functional unit and sold or used as an independent product, the functions may be stored in a computer-readable storage medium. Based on such an understanding, the technical solution of the present disclosure essentially, or the part contributing to the prior art, or a part of the technical solution may be implemented in a form of a software product. The computer software product is stored in a storage medium, and includes several instructions for enabling a computer device (which may be a personal computer, a server, or a network device, etc.) to perform all or a part of the steps of the methods described in the embodiments of the present disclosure. The foregoing storage medium includes: any medium that can store program codes, such as a USB flash disk, a mobile hard disk, a read-only memory (ROM), a random access memory (RAM), a magnetic disk, or an optical disc, etc.

The above descriptions are merely specific embodiments of the present disclosure; however, the protection scope of the present disclosure is not limited thereto. Any modification or replacement that may be readily envisaged of by persons skilled in the art within the technical scope disclosed in the present disclosure should fall into the protection scope of the present disclosure. Thus, the protection scope of the present disclosure shall be subject to the claims.

The invention claimed is:

1. A data transmission method, comprising:
transmitting, by a transmitting device, at a first time instant, a first data signal to a receiving device over a first data stream using a first frequency and a second data signal to the receiving device over a second data stream using the first frequency, and transmitting, by the transmitting device, at a second time instant after the first time instant, a third data signal to the receiving device over the first data stream using the first frequency and a fourth data signal to the receiving device over the second data stream using the first frequency, wherein the third data signal is equal to a negative conjugate of the second data signal, the fourth data signal is equal to a conjugate of the first data signal, and the first data stream and the second data stream are used by the receiving device to determine the first data signal and the second data signal;
or
transmitting, by the transmitting device, at a first time instant, a first data signal to the receiving device over a first data stream using a first frequency and a second data signal to the receiving device over a second data stream using the first frequency, and transmitting, by the transmitting device, at the first time instant, a third data signal to the receiving device over the first data stream using a second frequency and a fourth data signal to the receiving device over the second data stream using the second frequency, wherein the third data signal is equal to a negative conjugate of the second data signal, the fourth data signal is equal to a conjugate of the first data signal, and the first data stream and the second data stream are used by the receiving device to determine the first data signal and the second data signal;
wherein the first data stream and the second data stream are mapped to a same transmission block.

2. The method according to claim 1, wherein the transmitting device is a terminal device, and the receiving device is a base station; and wherein the method further comprises:

receiving, by the terminal device, indication information from the base station, wherein the indication information is used to indicate a mode for transmission of a data signal between the terminal device and the base station.

3. The method according to claim 1, wherein the transmitting device is a base station, and the receiving device is a terminal device; and wherein the method further comprises:
transmitting, by the base station, indication information to the terminal device, wherein the indication information is used to indicate a mode for transmission of a data signal between the terminal device and the base station.

4. The method according to claim 1, wherein the transmitting device is a base station, and the base station comprises a first base station and a second base station;
wherein the transmitting, by a transmitting device, at a first time instant, a first data signal to a receiving device over a first data stream using a first frequency and a second data signal to the receiving device over a second data stream using the first frequency comprises:
transmitting, by the first base station, at the first time instant, the first data signal to the receiving device over the first data stream using the first frequency; and
transmitting, by the second base station, at the first time instant, the second data signal to the receiving device over the second data stream using the first frequency.

5. A data transmission method, comprising:
transmitting, by a transmitting device, a first transmission block set to at least one receiving device, wherein a transmission block in the first transmission block set is mapped with a first data stream and the second data stream, and the first data stream and the second data stream are used to transmit a data signal comprising a first data signal and a second data signal; and
when the transmission block in the first transmission block set is transmitted erroneously, transmitting, by the transmitting device, a second transmission block set to the at least one receiving device, wherein a transmission block in the second transmission block set is mapped with a third data stream for transmitting a third data signal and a fourth data stream for transmitting a fourth data signal, the third data signal is equal to a negative conjugate of the second data signal, the fourth data signal is equal to a conjugate of the first data signal, and the second transmission block set and the first transmission block set are used by the at least one receiving device to determine the first data signal and the second data signal;
wherein the first transmission block set comprises a first transmission block to which the first data stream is mapped and a second transmission block to which the second data stream is mapped, and the second transmission block set comprises a third transmission block to which the third data stream is mapped and a fourth transmission block to which the fourth data stream is mapped;
wherein the transmitting device is a base station, and the at least one receiving device comprises a first terminal device and a second terminal device,
the transmitting, by the transmitting device, the first transmission block set to the at least one receiving device comprises:
transmitting, by the base station, the first transmission block to the first terminal device and the second transmission block to the second terminal device;
the transmitting, by the transmitting device, the second transmission block set to the at least one receiving device comprises:
transmitting, by the base station, the third transmission block to the first terminal device and the fourth transmission block to the second terminal device, wherein the first transmission block and the third transmission block are used by the first terminal device to determine the first data signal, and the second transmission block and the fourth transmission block are used by the second terminal device to determine the second data signal.

6. The method according to claim 5, wherein the first data stream is used to transmit the first data signal and the second data stream is used to transmit the second data signal.

7. The method according to claim 5, wherein,
the first data stream is used to transmit, at a first time instant, the first data signal using a first frequency and the third data signal using a second frequency; and
the second data stream is used to transmit, at the first time instant, the second data signal using the first frequency and the fourth data signal using the second frequency.

8. The method according to claim 5, wherein,
the first data stream is used to transmit, at a first time instant, the first data signal using a first frequency, and transmit, at a second time instant, the third data signal using the first frequency; and
the second data stream is used to transmit, at the first time instant, the second data signal using the first frequency, and transmit, at the second time instant, the fourth data signal using the first frequency.

9. The method according to claim 5, wherein the method further comprises:
transmitting, by the base station, indication information to the first terminal device and the second terminal device, wherein the indication information is used to indicate a retransmission mode used by the terminal device when a transmission block is transmitted erroneously.

10. A transmitting device, comprising a processor, a transceiver and a memory storing instructions thereon, wherein the processor is configured to execute the instructions to control the transceiver to:
transmit, at a first time instant, a first data signal to a receiving device over a first data stream using a first frequency and a second data signal to the receiving device over a second data stream using the first frequency, and transmit, at a second time instant after the first time instant, a third data signal to the receiving device over the first data stream using the first frequency and a fourth data signal to the receiving device over the second data stream using the first frequency, wherein the third data signal is equal to a negative conjugate of the second data signal, the fourth data signal is equal to a conjugate of the first data signal, and the first data stream and the second data stream are used by the receiving device to determine the first data signal and the second data signal;
or
transmit, at a first time instant, a first data signal to the receiving device over a first data stream using a first frequency and a second data signal to the receiving device over a second data stream using the first frequency, and transmit, at the first time instant, a third data signal to the receiving device over the first data stream using a second frequency and a fourth data signal to the receiving device over the second data stream using the second frequency, wherein the third data signal is equal to a negative conjugate of the second data signal, the fourth data signal is equal to a conjugate of the first data signal, and the first data stream and the second data stream are used by the receiving device to determine the first data signal and the second data signal;

wherein the first data stream and the second data stream are mapped to a same transmission block.

11. The transmitting device according to claim 10, wherein, the transmitting device is a terminal device, and the receiving device is a base station; and wherein the processor is further configured to execute the instructions to control the transceiver to receive indication information from the base station, wherein the indication information is used to indicate a mode for transmission of a data signal between the terminal device and the base station.

12. The transmitting device according to claim 10, wherein the transmitting device is a base station, and the receiving device is a terminal device; and wherein the processor is further configured to execute the instructions to control the transceiver to transmit indication information to the terminal device, wherein the indication information is used to indicate a mode for transmission of a data signal between the terminal device and the base station.

* * * * *